(12) United States Patent
Ouzieli et al.

(10) Patent No.: US 10,349,325 B2
(45) Date of Patent: Jul. 9, 2019

(54) WIRELESS COMMUNICATION DEVICE, SYSTEM AND METHOD TO EFFECT FAST BASIC SERVICE SET TRANSITION ROAMING WITH LOCATION INFORMATION

(71) Applicant: Intel IP Corporation, Santa Clara, CA (US)

(72) Inventors: Ido Ouzieli, Tel-Aviv (IL); Shahar Michaelovich, Raanana (IL); Necati Canpolat, Beaverton, OR (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/474,497

(22) Filed: Mar. 30, 2017

(65) Prior Publication Data
US 2018/0288664 A1   Oct. 4, 2018

(51) Int. Cl.
*H04W 36/08* (2009.01)
*H04W 64/00* (2009.01)
*H04W 36/00* (2009.01)

(52) U.S. Cl.
CPC ....... *H04W 36/08* (2013.01); *H04W 36/0083* (2013.01); *H04W 64/00* (2013.01)

(58) Field of Classification Search
CPC .................................................... H04W 48/20
See application file for complete search history.

(56) References Cited

U.S. PATENT DOCUMENTS

| | | | |
|---|---|---|---|
| 2013/0308470 A1* | 11/2013 | Bevan | H04W 64/00 370/252 |
| 2014/0098682 A1* | 4/2014 | Cao | H04W 36/00835 370/252 |

* cited by examiner

*Primary Examiner* — Ayanah S George
(74) *Attorney, Agent, or Firm* — Alliance IP, LLC

(57) ABSTRACT

A wireless communication device, system and method. The device comprises a memory and processing circuitry coupled to the memory. The processing circuitry has logic to cause transmission of a first frame to a wireless access point (AP), the first frame including information regarding a location of the device, the information regarding a location of the device including information regarding a current location of the device or information regarding a target location to result from movement of the device. The processing circuitry is further to process a second frame from the AP, the second frame including a list of one or more roaming candidate APs, wherein the list is based on the information regarding the location of the device in the first frame. The processing circuitry is further to cause scanning of one or more channels corresponding to the one or more roaming candidate APs in response to the second frame, and transition to one of the one or more roaming candidate APs after causing scanning.

25 Claims, 7 Drawing Sheets

| Transition Reason Value | Description |
|---|---|
| 0 | Unspecified |
| 1 | Excessive frame loss rates and/or poor conditions |
| 2 | Excessive delay for current traffic streams |
| 3 | Insufficient QoS capacity for current traffic streams (TSPEC rejected) |
| 4 | First association to ESS (the association initiated by an Association Request frame instead of a Reassociation Request frame) |
| 5 | Load balancing |
| 6 | Better AP found |
| 7 | Deauthenticated or Disassociated from the previous AP |
| 8 | AP failed IEEE 802.1X EAP Authentication |
| 9 | AP failed 4-way handshake |
| 10 | Received too many replay counter failures |
| 11 | Received too many data MIC failures |
| 12 | Exceeded maximum number of retransmissions |
| 13 | Received too many broadcast disassociations |
| 14 | Received too many broadcast deauthentications |
| 15 | Previous transition failed |
| 16 | Low RSSI |
| 17 | Roam from a non-IEEE 802.11 system |
| 18 | Transition due to received BSS Transition Request frame |
| 19 | Preferred BSS transition candidate list included |
| 20 | Leaving ESS |
| 21 | Movement |
| 22-255 | Reserved |

Fig. 4

WIRELESS COMMUNICATION DEVICE, SYSTEM AND METHOD TO EFFECT FAST BASIC SERVICE SET TRANSITION ROAMING WITH LOCATION INFORMATION

TECHNICAL FIELD

Embodiments generally relate to technologies to manage wireless networks. Specifically, various techniques and systems are provided for managing fast transition of a station (STA) from one access point (AP) to another AP within an extended service set (ESS) in a wireless network, such as a wireless network compliant with an Institute of Electrical and Electronics Engineers (IEEE) wireless networking standard, such as an IEEE 802.11 standard. Embodiments further pertain to devices and wireless networks compliant with the Wi-Fi Alliance (WFA) Multiband Operations specification.

BACKGROUND

A wireless network is a telecommunications network that allows wireless communication devices and systems to exchange data. Wireless computer networks may have configured devices, such as APs, which act as transmitters and receivers of wireless signals to and from STAs, and which may further be networked together through a backbone to form an ESS. The ESS is defined by the IEEE 802.11 standard and set of amendments (hereinafter Wi-Fi), and consists of a formation which links a plurality of basic service sets (BSS') together with the backbone. The backbone may include wired Ethernet which connects APs to one another in the ESS. All the clients connected to the same and different BSS' can communicate among each other within the ESS.

The current state of the art provides various mechanisms for the STA to determine which new AP to associate with if it needs to break its association with its current AP. The STA may, for example, use a probe request and probe response exchange with the APs within an ESS in order to determine its new/target AP. The STA may alternatively use the "BSS Transition Management" mechanism set forth in IEEE 802.11v by transmitting a BSS Transition Management Query to its current AP to determine, based on a BSS Transition Management Request from its current AP sent in response to the BSS Transition Management Query, a list roaming candidate APs whose channels the STA could scan to determine its target AP (the AP it will roam to) from the list.

BRIEF DESCRIPTION OF THE DRAWINGS

The present disclosure is illustrated by way of example and not limitation in the figures of the accompanying drawings, in which like references indicate similar elements and in which:

FIG. 4 is a table showing "Transition Reason Codes" versus a "Description" for the same for the frame of FIG. 3b according to some demonstrative embodiments;

DETAILED DESCRIPTION

Figure 1:
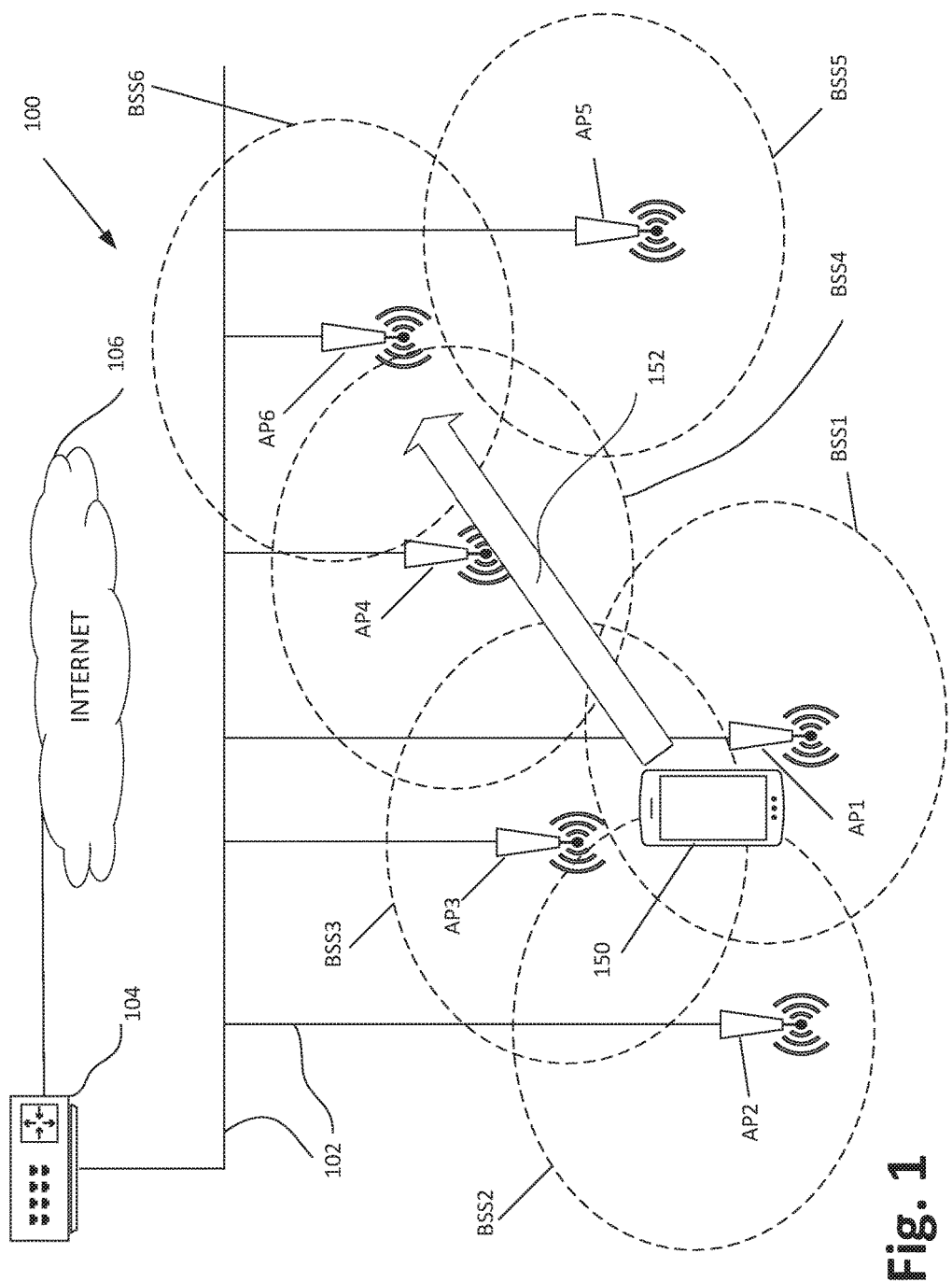
FIG. 1 illustrates an ESS in accordance with some demonstrative embodiments.

The following description and the drawings sufficiently illustrate specific embodiments to enable those skilled in the art to practice them. Other embodiments may incorporate structural, logical, electrical, process, and other changes. Portions and features of some demonstrative embodiments may be included in, or substituted for, those of other embodiments. Embodiments set forth in the claims encompass all available equivalents of those claims.

Members of the Wi-Fi Alliance have formed a Multiband Operations (MBO) task group to explore technology and certification requirements to improve Wi-Fi network performance through the efficient use of available frequency bands, channels and network infrastructure. Wi-Fi certified infrastructure and client devices operating in accordance with MBO are to exchange information to enable intelligent band selection decisions, including the capability to steer clients to the other networks, such as a cellular network, when appropriate. The task group is defining mechanisms that are applicable to available frequency bands, and which may be extended to include additional bands as they come into use. Some demonstrative embodiments described herein may be in compliance with MBO requirements.

With respect to the BSS transitioning of a STA, IEEE 802.11 defines a scanning mechanism to allow the STA to discover its neighbor APs that may represent roaming candidates for the STA to transition to. Even after having associated with an AP, a STA may need to continuously perform scanning of available channels to discover candidate APs to associate with when needed, this process being referred to as "roaming." One main use of roaming pertains to a STA that is moving away from the AP with which it is associated (we will call this AP the "current AP"). For a STA moving away from its current AP, the Wi-Fi signal between the STA and its current AP may degrade, and the STA may need to find another AP for fast association, that is, for association before the Wi-Fi connection with its current AP is lost. In such a case, the STA may initiate a roaming process to find a target AP from roaming candidate APs after receiving a list of the roaming candidate APs from its current AP.

As part of a roaming flow, according to the state of the art, the STA may for example transmit a broadcast Probe request to all neighbor APs within range of the STA, such as all APs of the ESS of the STA. The available neighbor APs may then each respond with their respective probe responses. A main limitation of the above mechanism is the fact that the STA would need to scan all Wi-Fi channels across all available bands in order to find a matching/target AP from the available roaming candidate APs. The target AP would belong to the same Service Set Identifier (SSID) as the current AP (that is, same ESS as the current AP) so that the active session with the current AP would not break from the roaming candidate APs. This mechanism may lead to a need to scan, for example in Wi-Fi, not only 14 channels on a 2.4 GHz band, but also 36 channels on the 5.2 GHz band, 60 GHz band, and future bands. The above would mean that the time for generating and sending a probe request broadcast per channel, waiting for a probe response from the AP on each channel, and processing the probe response would have to be repeated many times as the precise channel on which the potential target AP (the AP that the STA would eventually transition to) could be located would not be known in advance.

To solve the above issue, according to the state of the art, IEEE 802.11v has introduced the concept of the BSS transition management. IEEE 802.11v is the Wireless Network Management standard for the IEEE 802.11 family of standards, and allows client devices to exchange information about the network topology, including information about the wireless environment, making each network aware, and facilitating overall improvement of the wireless network. In particular, 802.11v suggests that, before a STA begins the roaming process, it is to transmit a "BSS Transition Management Query" frame to its current AP, effectively asking the current AP for a recommendation of suitable APs to transition to, that is, for a list of roaming candidate APs. By virtue of the APs within the ESS being connected to one another by way of a backbone, the current AP would have information on neighbor APs from the same ESS, including information on their respective operational statuses and current loads. This information may be received by the current AP through a central WLAN controller (WLC), that may communicate with the APs in the ESS through a data center network and/or using radio resource measurement messages in a well-known manner. The state of the art provides multiple mechanisms to allow a current AP to collect the necessary information regarding neighbor APs, as would be recognized by one skilled in the art.

According to 802.11v, in response to the BSS Transition Management Query frame, the AP is to transmit a "BSS Transition Management Request" frame that contains a list of roaming candidate APs generated by the AP. The STA would then use the list of roaming candidate APs as a list of APs whose channels the STA is to scan to determine its target AP for transitioning.

An issue with the above mechanism in 802.11v is that the list of roaming candidate APs generated by the current AP can only be based on the current operational status of those APs vis-à-vis the STA, with the assumption that the STA is static/not moving. The list therefore ignores a direction of movement of the STA if the STA is in fact moving. However, as previously suggested, in most roaming scenarios a STA is not static. For a moving STA, the STA would be interested in discovering roaming candidate APs located in an area toward which the STA is moving (and not getting further away from). In addition, even where a STA is not moving, its link with its current AP may deteriorate for any number of reasons. According to the state of the art, the list of roaming candidate APs would take into consideration only a distance of the STA with respect to its current AP, and would not take into consideration a location of the STA with respect to its current AP that includes not only distance but also a direction in which the STA may be located in relation to its current AP. It would be desirable therefore for a STA to be able to provide information regarding its location to its current AP in order to obtain a list of roaming candidate APs that may offer a better chance of success with respect to a transitioning of the STA to the same during roaming.

The location information/information regarding a location of the system may include information indicating location (latitude, longitude and/or altitude for either a current location or an estimated target location), vector of movement including direction of movement, speed of movement, and acceleration.

Let us now refer to FIG. 1, which illustrates an ESS in a Wireless Local Area Network (WLAN) 100 in accordance with some demonstrative embodiments, where a STA is moving away from its current AP. The ESS may comprise a plurality of Basic Service Sets (BSS') BSS1, BSS2, BSS3, BSS 4, BSS 5 and BSS 6 as shown, with respective coverage areas marked by broken lines in the figure. The BSS' include respective APs, AP1, AP2, AP3, AP4, AP5 and AP6 as shown. Each BSS may include one or more STAs associated with a corresponding AP of the BSS, although only one STA 150 is shown in the figure as being associated with AP1 in BSS1 in order to simplify the figure. The backbone is shown in the form of a WLC 104 that on the one hand connects to the internet 106, and on the other hand connects to the respective APs of the ESS through connections 102, such as wired Ethernet connections. In the ESS environment of FIG. 1, STA is shown by way of arrow 152 as moving in the direction of BSS 4 and BSS 6.

The AP's may use one of the IEEE 802.11 wireless communication protocols to transmit and receive. The AP's may further include a base station. The AP's may use other communications protocols as well as any of the IEEE 802.11 protocols. The IEEE 802.11 protocols may include the IEEE 802.11ax protocol. The IEEE 802.11 protocols may include using orthogonal frequency division multiple-access (OFDMA), time division multiple access (TDMA), and/or code division multiple access (CDMA). The IEEE 802.11 protocols may include a multiple access technique. For example, the IEEE 802.11 protocol may include space-division multiple access (SDMA) and/or multiple-user multiple-input multiple-output (MU-MIMO).

The STA may operate in accordance with a wireless communication protocol, such as one or more of IEEE 802.1111a/b/g/n/ac/ax, and/or other wireless communication protocols. The STA may further include wireless transmit and receive devices such as cellular telephones, smart telephones, handheld wireless devices, wireless glasses, wireless watches, wireless personal devices, tablets, or other devices that may be transmitting and receiving using the any of the IEEE 802.11 protocols such as IEEE 802.11ax or another wireless communication protocol.

In some demonstrative embodiments, an 802.11ax frame may be communicated on a subchannel that may have a bandwidth of 20 MHz, 40 MHz, or 80 MHz, 160 MHz, or 320 MHz contiguous bandwidths or an 80+80 MHz (160 MHz) non-contiguous bandwidth. In some demonstrative embodiments, the bandwidth of an 802.11ax subchannel may be 2.03125 MHz, 4.0625 MHz, 8.28125 MHz, a combination thereof, or another bandwidth that is less or equal to the available bandwidth may also be used. An 802.11 ax frame may be configured for transmitting a number of spatial streams, which may be in accordance with MU-MIMO. In other embodiments, the APs and STA may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), Bluetooth®, or other technologies.

Referring still to FIG. 1, if the shown ESS were to operate according to the state of the art (which it does not—it is to be kept in mind that the ESS of FIG. 1 operates according to some demonstrative embodiments), when the current AP, AP1, using 802.11v, generates the list of roaming candidate APs, it would assume that the STA 150, the client of the list of roaming candidate APs, is located next to it and is stationary. As a result, AP1 would include AP2 and AP3 in the list of roaming candidate APs in its BSS Transition Management Request (because AP2 and AP3 area also closest to STA 150). In this scenario, the STA 150 would be scanning the Wi-Fi channels of AP2 and AP3. However, in reality, the STA would actually be moving away from AP2 and AP3 toward AP4 and AP6, and scanning the channels of AP2 and AP3 would in most cases be wasteful and ineffective. The current state of the art, by disregarding a direction of movement of the STA in an ESS, may cause the STA to scan non-relevant, or at best potentially less relevant APs for transition, disadvantageously consuming battery life, increasing service interruptions, wasting precious airtime for other STAs that are on the non-relevant channels, and, importantly, risking current Wi-Fi service on the roaming STA.

According to some demonstrative embodiments, when applying roaming procedures as a result of movement of a roaming STA, the roaming STA may determine information its movement and may send this information to the AP. The AP may then use this information in order to generate the list of roaming candidate APs for the STA, the list now matching an expected new location/target location for transition of the STA to a target AP. The STA may use the list of roaming candidate APs to scan available channels and transition to a target AP accordingly.

Referring still to FIG. 1, according to some demonstrative embodiments, STA 150, after detecting its location, its movement and its direction of movement, may send to AP1 information regarding its movement. AP1 would then, having this information, and further having information regarding neighboring APs, generate and transmit information to STA 150 including a list of roaming candidate APs based on the information regarding a location of the STA 150, in this case a target location toward which the STA is estimated to be moving. The list, in the shown scenario of FIG. 1, may for example include AP4 and AP6, different from AP2 and AP3 that would be suggested according to the state of the art. According to some demonstrative embodiments, when generating the list of roaming candidate APs, the current AP may increase a priority of APs whose locations match an estimated target location of the STA, and further optionally based on each AP's current operational status and load.

Figure 2:
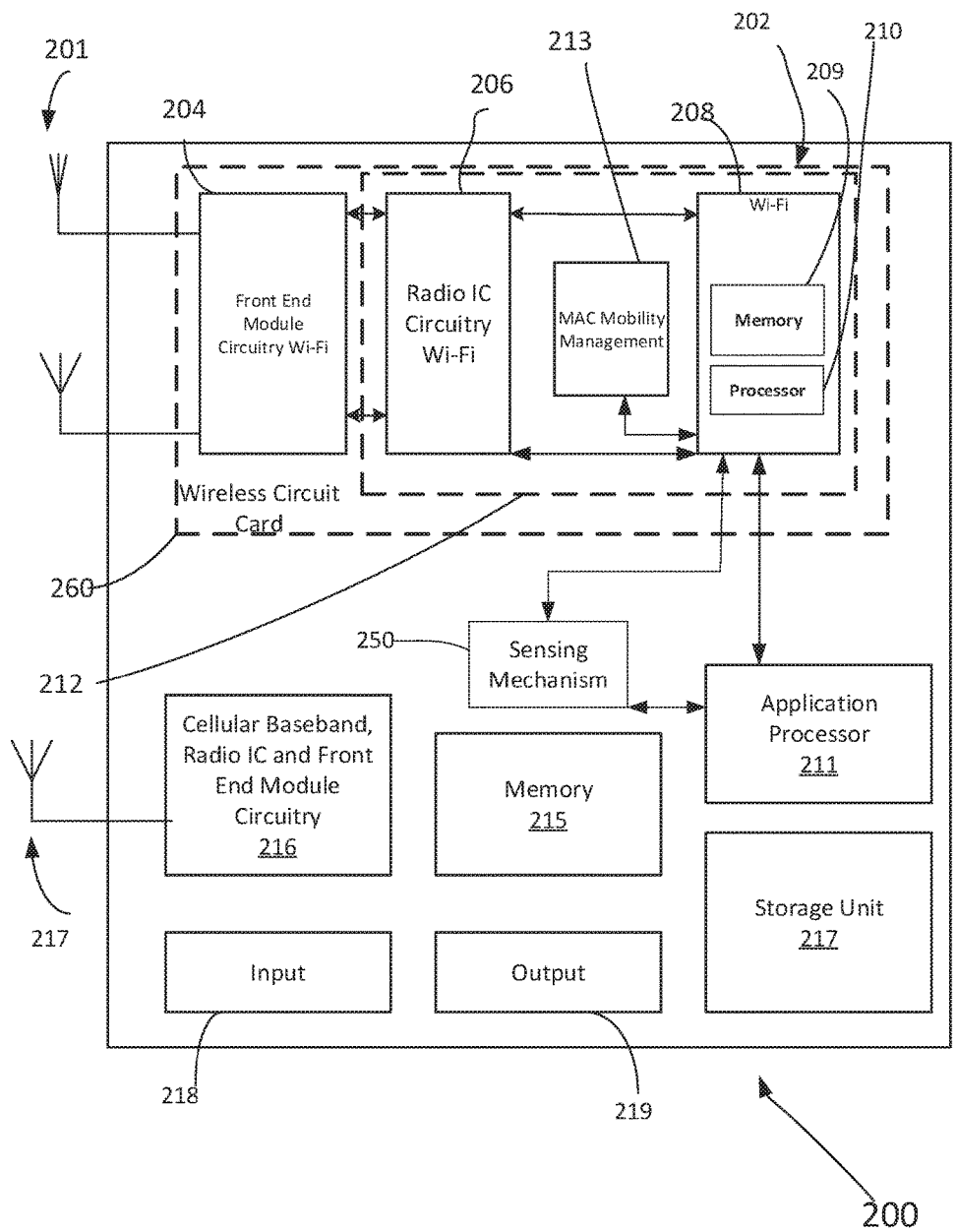
FIG. 2 illustrates a radio system of a STA or an AP from the ESS of FIG. 1 in accordance with some demonstrative embodiments.

Reference will now be made to FIG. 2. FIG. 2 depicts one embodiment of radio system 200 such as one embodiment of a STA, or one embodiment of a AP, such as the APs, or STA shown in FIG. 1. At certain points within the below description, FIG. 2 will be described in reference to a system such as a STA, while at certain other points within the below description, FIG. 2 will be described in reference to a system such as an AP. The context will however be clear based on the description being provided. Furthermore, in the instant description, "processor" and "processing circuitry" are used interchangeably, and refer to circuitry forming one or more processor "blocks" that provides processing functionality.

Referring next to FIG. 2, a block diagram is shown of a wireless communication radio system 200 such as STA or AP (hereinafter STA/AP) such as the STA or any of the APs of FIG. 1, according to some demonstrative embodiments. A wireless communication system may include a radio card 202 in accordance with some demonstrative embodiments.

Radio card 202 may include radio front-end module (FEM) circuitry 204, radio IC circuitry 206 and baseband processor 208.

In FIG. 2, it is to be noted that the representation of a single antenna may be interpreted to mean one or more antennas.

FEM circuitry 204 may include Wi-Fi functionality, and may include receive signal path comprising circuitry configured to operate on Wi-Fi signals received from one or more antennas 201, to amplify the received signals and to provide the amplified versions of the received signals to the radio IC circuitry 206 for further processing. FEM circuitry 204 may also include a transmit signal path which may include circuitry configured to amplify signals provided by the radio IC circuitry 206 for wireless transmission by one or more of the antennas 201. The antennas may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC circuitry 206 may include Wi-Fi functionality, and may include a receive signal path which may include circuitry to down-convert signals received from the FEM circuitry 204 and provide baseband signals to baseband processor 208. The radio IC circuitry 206 may also include a transmit signal path which may include circuitry to up-convert baseband signals provided by the baseband processor 208 and provide RF output signals to the FEM circuitry 204 for subsequent wireless transmission by the one or more antennas 201.

Baseband processor 208 may include processing circuitry that provides Wi-Fi functionality. In the instant description, the baseband processor 208 may include a memory 209, such as, for example, a set of RAM arrays in a Fast Fourier Transform or Inverse Fast Fourier Transform block (not shown) of the baseband processor 208. Processing circuitry 210 may include control logic to process the signals received from the receive signal path of the radio IC circuitry 206. Baseband processor 208 is also configured to also generate corresponding baseband signals for the transmit signal path of the radio IC circuitry 206, and may further include physical layer (PHY) and medium access control layer (MAC) circuitry, and may further interface with application processor 211 for generation and processing of the baseband signals and for controlling operations of the radio IC circuitry 206. Referring still to FIG. 2, according to the shown embodiment, a MAC mobility management processor 213 may include a processor having logic to provide a number of higher MAC functionalities. In the alternative, or in conjunction with the MAC mobility management processor 213, some of the higher-level MAC functionalities above may be provided by application processor 211.

In some demonstrative embodiments, the front-end module circuitry 204, the radio IC circuitry 206, and baseband processor 208 may be provided on a single radio card, such as wireless radio card 202. In some other embodiments, the one or more antennas 201, the FEM circuitry 204 and the radio IC circuitry 206 may be provided on discrete/separate cards or platforms. In some other embodiments, the radio IC circuitry 206 and the baseband processor 208 may be provided on a single chip or integrated circuit (IC), such as IC 212.

In some demonstrative embodiments, the wireless radio card 202 may include a Wi-Fi radio card and may be configured for Wi-Fi communications, although the scope of the embodiments is not limited in this respect. In some other embodiments, the radio card 202 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some demonstrative embodiments, the system 200 may include other radio cards, such as a cellular radio card configured for cellular (e.g., 3GPP such as LTE, LTE-Advanced or 5G communications).

In some IEEE 802.11 embodiments, the radio card 202 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. The scope of the embodiments is not limited with respect to the above center frequencies however.

Referring still to FIG. 2, in some demonstrative embodiments, STA/AP may further include an input unit 218, an output unit 219, a memory unit 215. STA/AP may optionally include other suitable hardware components and/or software components. In some demonstrative embodiments, some or all of the components of STA/AP may be enclosed in a common housing or packaging, and may be interconnected or operably associated using one or more wired or wireless links. In other embodiments, components of STA/AP may be distributed among multiple or separate devices.

In some demonstrative embodiments, application processor 211 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 211 may execute instructions, for example, of an Operating System (OS) of STA/AP and/or of one or more suitable applications.

In some demonstrative embodiments, input unit 218 may include, for example, one or more input pins on a circuit board, a keyboard, a keypad, a mouse, a touch-screen, a touch-pad, a track-ball, a stylus, a microphone, or other suitable pointing device or input device. Output unit 219 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory 215 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units. Storage unit 217 may include, for example, a hard disk drive, a floppy disk drive, a Compact Disk (CD) drive, a CD-ROM drive, a DVD drive, or other suitable removable or non-removable storage units. Memory unit 215 and/or storage unit 217, for example, may store data processed by STA/AP.

The system 200 may further include a sensing mechanism/location engine 250, which may be coupled to the baseband processor 208 and application processor 211, and which may be configured to detect information regarding a location of the system 200. The location engine may include either dedicated processing circuitry including logic to allow a determination of location information, or it may include logic that is embedded within the application processor 211 (not shown). The location information/information regarding a location of the system may include information indicating location (latitude, longitude and/or altitude for either a current location or an estimated target location), direction of movement, speed of movement, acceleration, etc. For example, the location engine may be configured to determine an estimated target location of the system in any number of ways. According to a first embodiment, the location engine may estimate the target location by determining a current location of the system, its speed and its direction of movement, and based on the latter, guess a target location at which the system may stop. According to a second embodiment, the location engine may use information regarding a pattern of movement of the system to guess the target location of the system. According to a third embodiment, the location engine may further use stored map information for a general location of the ESS in order to hone its guess of a target location of the system. Embodiments may include any combination of the first, second and third embodiments of estimating a target location of the system. The location engine may include functionality of a compass, an accelerometer, a gyroscope, a Global Positioning System (GPS), for example in combination, which together may tell the system its speed and direction, as would be recognized by one skilled in the art.

Figure 3A:
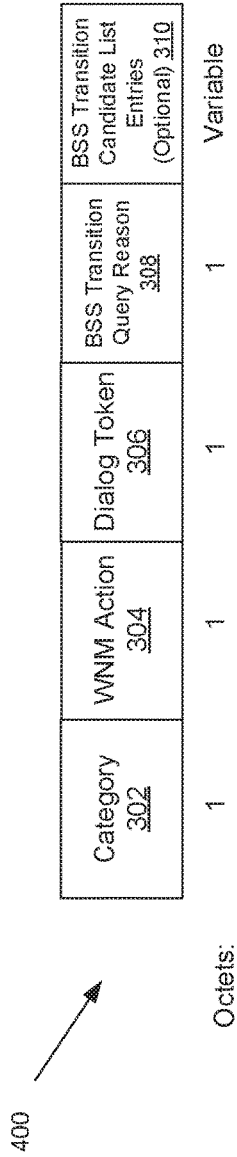
FIG. 3a illustrates a BSS Transition Management Query frame in the time domain according to the state of the art.
Figure 3B:
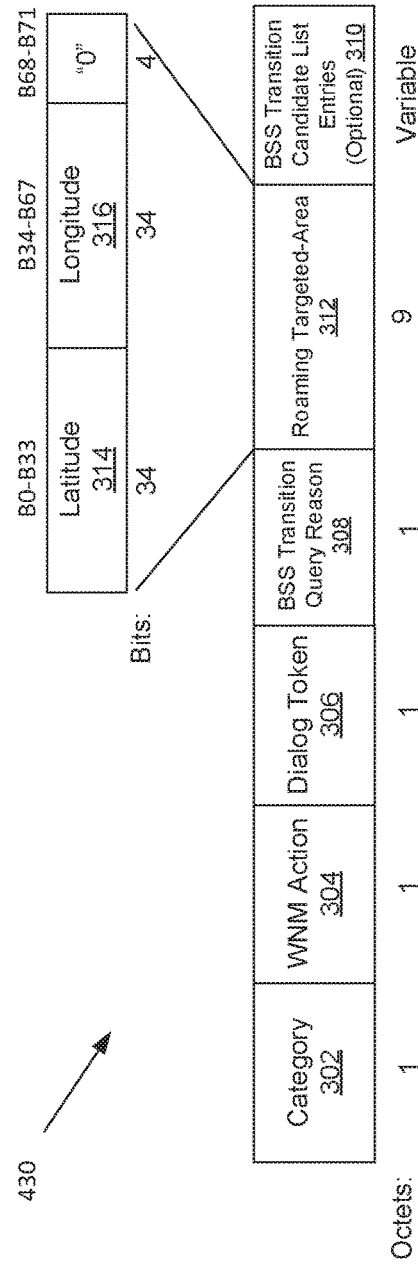
FIG. 3b illustrates a BSS Transition Management Query frame in the time domain according to some demonstrative embodiments.

Referring next to FIGS. 3a and 3b, frame structures in the time domain are shown for a BSS Transition Management Query frame according to the prior art (FIG. 3a), and for a BSS Transition Management Query frame according to some demonstrative embodiments (FIG. 3b). As shown in FIG. 3a, the BSS Transition Management Query frame 300 according to the state of the art in 802.11v includes a Category field 302, a WNM Action field 304, a Dialog Token field 306, a BSS Transition Query Reason field 308, and a BSS Transition Candidate List Entries field 310, this latter field being optional in 802.11v. Each of the above fields, except for the BSS Transition Candidate List Entries field, may have a size of 1 octet as shown, with the BSS Transition Candidate List Entries field having a variable size. The Category field 302 may be set to a code value equal to 10 to indicate a WNM Action frame for the BSS Transition Management Query frame. The WNM Action field 304 may be set to a value equal to 6 to indicate a BSS Transition Management Query frame. The Dialog Token field 306 may be set to a nonzero value chosen by the STA sending the BSS Transition Management Query frame to identify the query/request/response transaction. The BSS Transition Query Reason field 310 is an optional field containing the reason code for a BSS transition management query. The BSS Transition Candidate List Entries field 310 contains zero or more Neighbor Report elements, which elements may be collected by the STA as part of its scanning procedures and provided to the current AP. The Neighbor Report elements, where present, my include information regarding additional APs that the STA may have discovered in its range and that the STA determines ought to be sent to the current AP to supplement the list of roaming candidate APs determined by the current AP. The length of the BSS Transition Candidate List Entries field in a BSS Transition Management Query frame is variable and limited by the maximum MAC Management Protocol Data Unit size according to IEEE 802.11.

Referring next to FIG. 3b, according to some demonstrative embodiments, an optional Roaming Targeted-Area field may be added to the BSS Transition Management Query frame, as shown by Roaming Targeted-Area field 312 added to the BSS Transition Management Query frame 330 of FIG. 3b. As seen in FIG. 3b, the other shown fields may be identical to the fields in FIG. 3a, except for the fact that, according to some demonstrative embodiments, the BSS Transition Query Reason field 308 may now be set to a value equal to 21 to indicate "movement" of a STA. A list of possible reason codes according to some demonstrative embodiments is shown in FIG. 4 in the form of a table plotting "Transition Reason Value" against its "Description," with the Transition Reason value of 21 and its description having been added with respect to the current Transition Reason Values set forth in 802.11v.

Referring still to FIG. 3b, according to some embodiments, the Roaming Targeted-Area field may have a size of 9 octets, and may include information regarding a location of the STA (either its current location, or an estimated targeted location of the STA is the STA is moving), such as the STA 150 of FIG. 1. The information regarding a current location of a STA may include its latitude and longitude for example. The information regarding the movement of the STA may include information regarding estimated coordinates of a target location toward which movement of the STA is to take place. For example, the Roaming Targeted-Area field 312 may include a latitude subfield 314 and a longitude subfield 316 respectively including information on a latitude and longitude of a target location toward which movement of the STA is to take place. The latitude subfield 314 and the longitude subfield 316 may each have a size of 34 bits, and may define a direction of movement of the STA. These subfields may be same as the latitude subfield and the longitude subfield well defined in IEEE 802.11 as part of the Location Configuration Information Element (LCI IE), or they may be different. According to some demonstrative embodiments, only a relevant subset of the LCI IEs may be used in the Roaming Targeted-Area field with the same format and structure for implementation efficiency, but under a scenario (movement of a roaming STA) different from those described currently in IEEE 802.11 for the use of LCI IEs. Bits B68 to B71 as shown in the figure are marked "0" in the Roaming Targeted-Area field in order to provide padding to the Roaming Targeted Area field based on the existing size of the LCI IEs and the LCI report.

Figure 5:
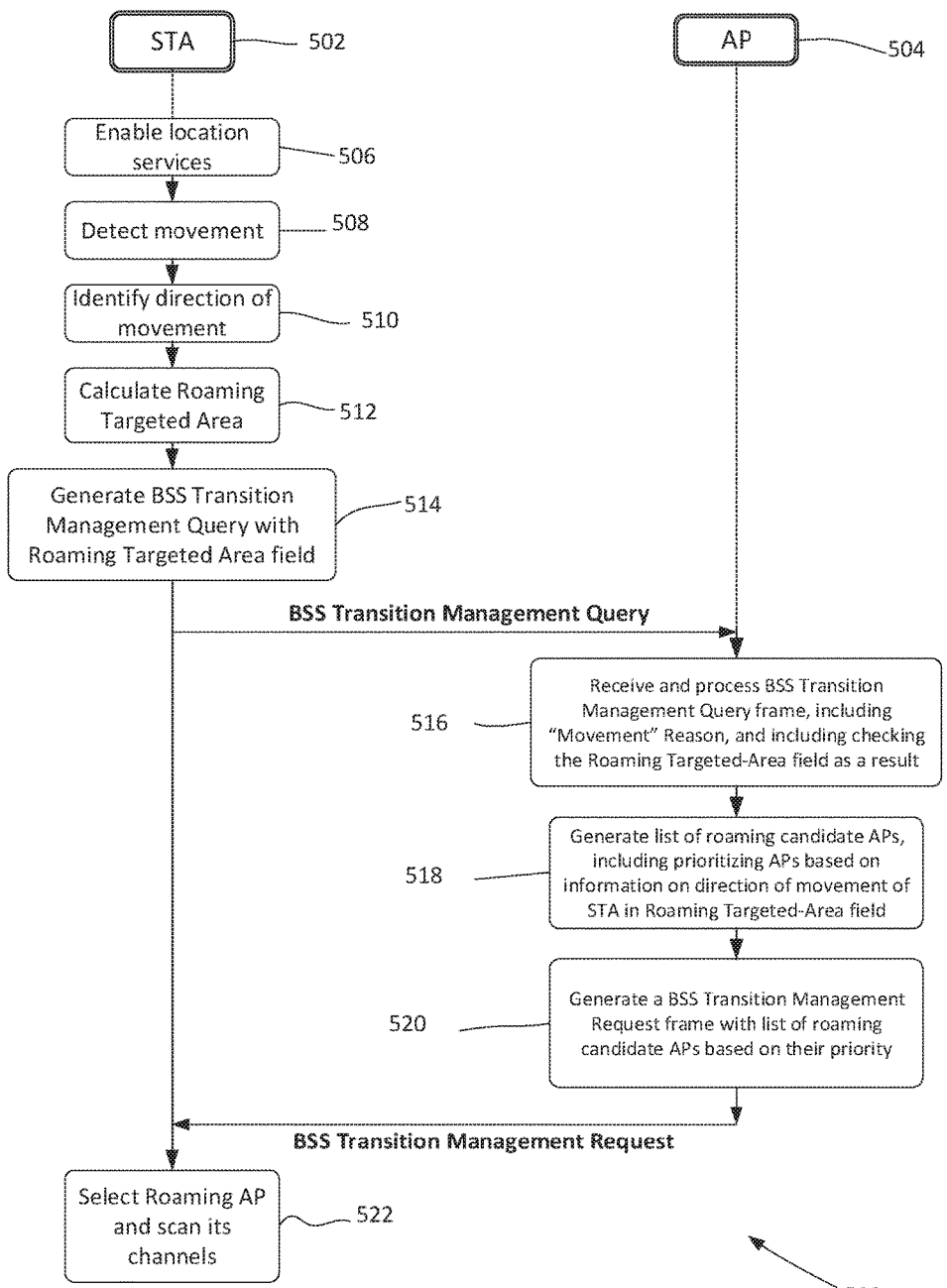
FIG. 5 illustrates a roaming flow showing an exemplary technique to effect BSS transition roaming according to some demonstrative embodiments.

Referring next to FIG. 5, a roaming flow 500 is shown according to some demonstrative embodiments. According to roaming flow 500, a STA 502, similar to STA 150 of FIG. 1, may first at 506 enable its location services in any known manner, such as through initialization. At 508 and 510, the STA may detect its own movement, and identify a direction of its own movement, for example using a location engine such as location engine 250 of the system 200 of FIG. 2. At 512, the STA may then determine the Roaming Targeted Area including information regarding a location of the STA, in this case for a target location toward which it is moving, for example by estimating coordinates of location toward which the STA is moving, such as a latitude and longitude of a location toward which the STA is moving. Thereafter, at 514, the STA may generate a BSS Transition Management Query Frame similar to frame 330 of FIG. 3b, that includes a Roaming Targeted Area field, such as field 312 of FIG. 3b, including the direction of movement information. At this time, the STA may transmit the BSS Transition Management Query frame including the Roaming Targeted-Area field to its current AP 504. At 516, AP 504 may receive the BSS Transition Management Query frame, and may start processing the same, including processing the BSS Transition Query Reason field, such as BSS Transition Query Reason field of FIG. 3b. A value in the BSS Transition Query Reason field, such as the value 21, may indicate to the AP 504 that the STA is moving, and therefore that a Roaming Targeted-Area field is present, and the AP 504 would then proceed to process the Roaming Targeted-Area field to obtain the information regarding direction of movement of the STA. Thereafter, at 518, the AP 504 may generate a BSS Transition Management Request frame with a list of roaming candidate APs based on their priority. For example, a priority of each AP on the list may be based, according to some demonstrative embodiments, on its proximity to the location toward which the STA is moving, on its current operational status and/or on it current load.

Reference will now be made to FIGS. 1-5 in order to describe some demonstrative embodiments, although it is to be noted that embodiments are not limited to what is described and shown herein with respect to FIGS. 1-5, or any of the other figures included herein.

According to some demonstrative embodiments, a wireless communication device, such as a baseband processor 208 within the STA of FIG. 2, may comprise a memory, such as memory 209 of FIG. 2, and processing circuitry, such as processing circuitry 210 of FIG. 2, the processing circuitry being coupled to the memory 209. The STA may for example correspond to the roaming STA 150 of FIG. 1 which is moving, or to a static STA that is roaming to another AP without moving. The processing circuitry may include logic to cause transmission of a first frame to a wireless access point (AP), the first frame including information regarding a location of the device. The information regarding a location of the device may include information on a current location of the device, or on a target location to result from movement of the STA. The AP may for example correspond to STA 150's current AP, AP1 of FIG. 1. While a processing circuitry may cause transmission, that is, may generate a frame for transmission, the actual transmission itself may be effected by way of the system including the radio system 202 and antennas 201. The processing circuitry may further process a second frame from the AP, the second frame including a list of one or more roaming candidate APs, wherein the list is based on the information regarding the location of the device in the first frame. The roaming candidate APs may therefore be selected by the AP, such as by AP1, based on a distance and direction of the STA from the AP, or based on movement of the STA with respect to the AP. The roaming candidate APs may represent APs whose channels the STA is to scan to determine its target AP for transitioning. After receiving the list of roaming candidate APs, the STA may scan one or more channels corresponding to the one or more roaming candidate APs in response to the second frame. Based on the scanning, the STA may then transition to one of the one or more roaming candidate APs as its target AP. According to some embodiments, the wireless communication device may encompass some or parts of a radio system, such as system 200 of FIG. 2.

According to some demonstrative embodiments, a wireless communication device, such as a baseband processor 208 within the AP of FIG. 2, may comprise a memory 209 and processing circuitry 210 coupled to the memory 209. The processing circuitry may process a first frame from a wireless station (STA), such as STA 150 of FIG. 1, the first frame including information regarding a location of the STA. The processing circuitry may then determine a list of one or more roaming candidate access points (APs) for the STA based on the information regarding the location of the STA. Thereafter, the processing circuitry may cause transmission of a second frame to the STA, the second frame including the list of one or more roaming candidate APs.

According to some embodiments, the memory may encompass memory 209 and/or memory 215, and the processing circuitry may encompass processing circuitry 210 of FIG. 2 and/or application processor 211 of FIG. 2. According to some embodiments the wireless communication device may be a system-level device such as the system 200 of FIG. 2.

Figure 6:
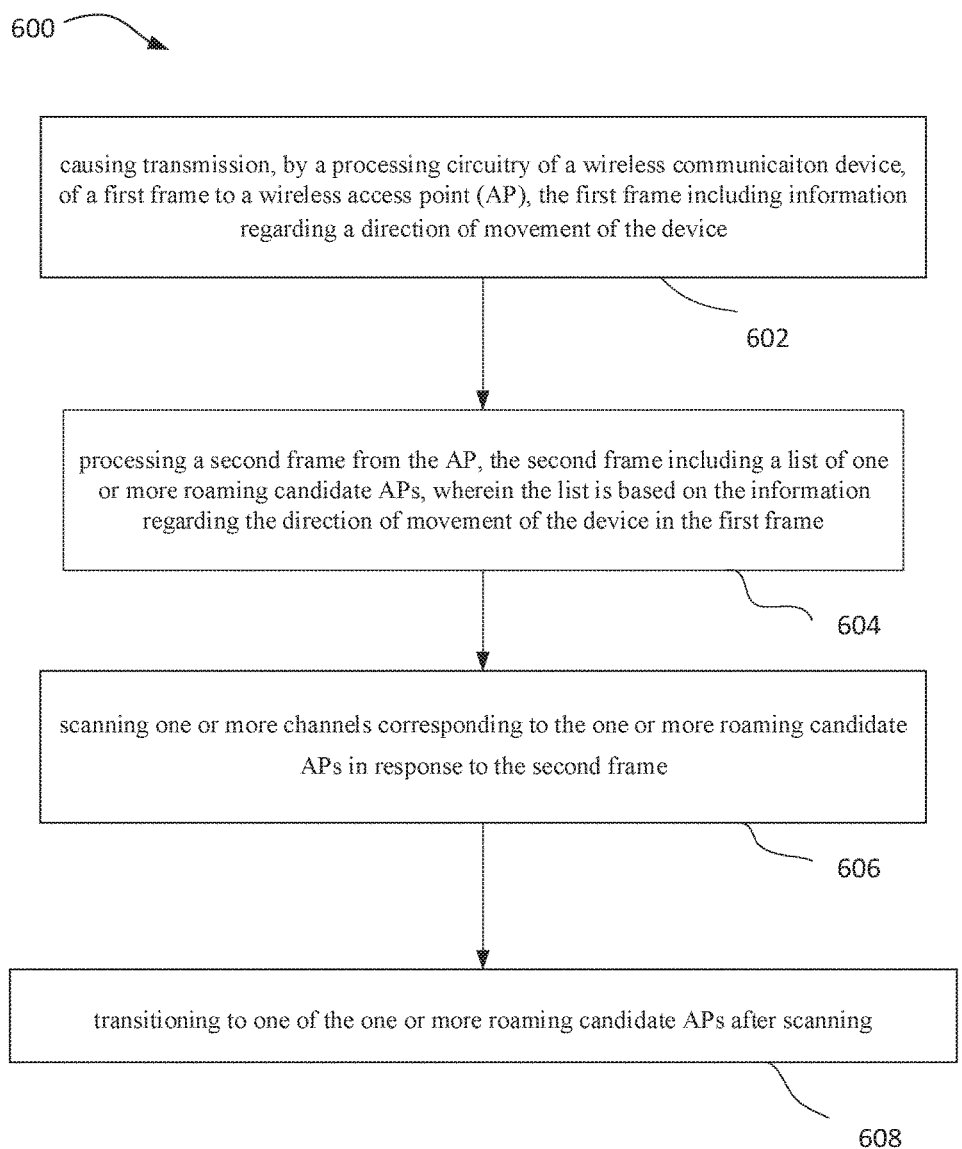
FIG. 6 illustrates a flow-chart of a method according to some demonstrative embodiments.

FIG. 6 illustrates a method 600 of operating a wireless communication device according to some demonstrative embodiments. The method 600 may begin with operation 602, which includes causing transmission of a first frame to a wireless access point (AP), the first frame including information regarding a location of the device. At operation 604, the method includes processing a second frame from the AP, the second frame including a list of one or more roaming candidate APs, wherein the list is based on the information regarding the location of the device in the first frame. Then, at operation 606, the method includes causing scanning one or more channels corresponding to the one or more roaming candidate APs in response to the second frame. At operation 608, the method includes transitioning to one of the one or more roaming candidate APs after causing scanning.

Figure 7:
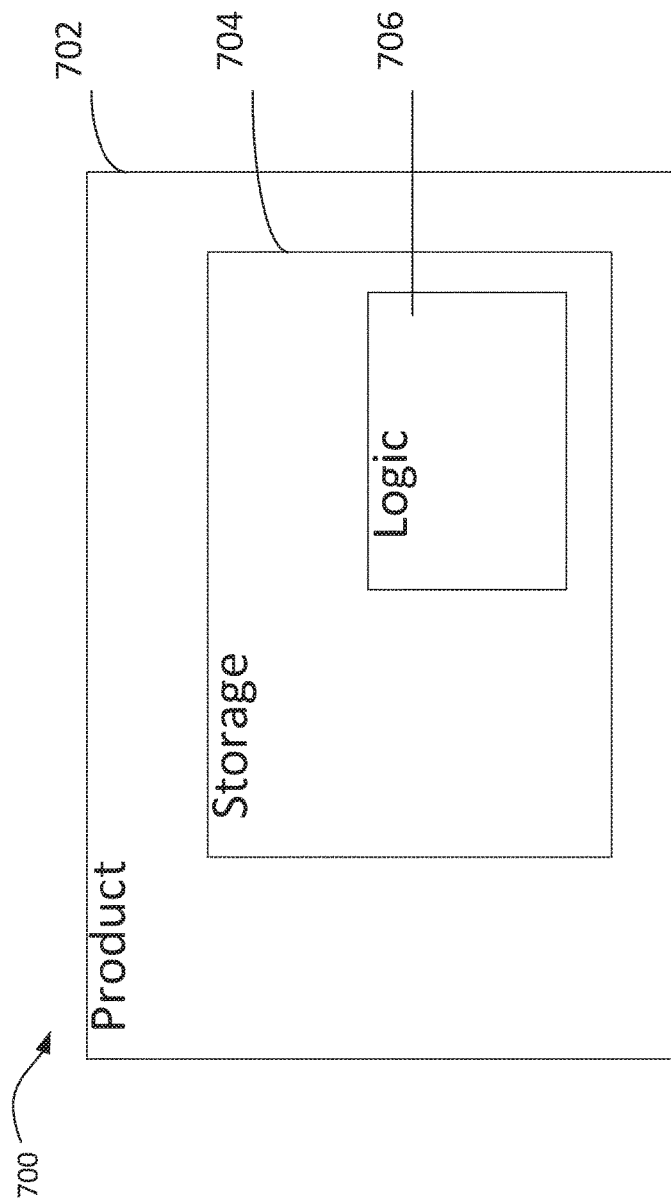
FIG. 7 illustrates a product of manufacture in accordance with some demonstrative embodiments.

FIG. 7 illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at one or more STAs or APs, and/or to perform one or more operations described above with respect to FIGS. 1-5, and/or one or more operations described herein. The phrase "non-transitory machine-readable medium" is directed to include all computer-readable media, with the sole exception being a transitory propagating signal.

In some demonstrative embodiments, product 700 and/or storage media 702 may include one or more types of computer-readable storage media capable of storing data, including volatile memory, non-volatile memory, removable or non-removable memory, erasable or non-erasable memory, writeable or re-writeable memory, and the like. For example, storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 200 of FIG. 2 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

EXAMPLES

The following examples pertain to further embodiments.

Example 1 includes a wireless communication device comprising a memory and processing circuitry coupled to the memory, the processing circuitry including logic to: cause transmission of a first frame to a wireless access point (AP), the first frame including information regarding a location of the device, the information regarding a location of the device including information regarding a current location of the device or information regarding a target location to result from movement of the device; and process a second frame from the AP, the second frame including a list of one or more roaming candidate APs, wherein the list is based on the information regarding the location of the device in the first frame; cause scanning of one or more channels corresponding to the one or more roaming candidate APs in response to the second frame; and transition to one of the one or more roaming candidate APs after causing scanning.

Example 2 includes the subject matter of Example 1, and optionally, wherein the first frame is a BSS Transition Management Query frame, and the second frame is a BSS Transition Management Request frame.

Example 3 includes the subject matter of Example 2, and optionally, wherein the BSS Transition Management Query frame includes a Roaming Targeted-Area field including the information regarding the location of the STA.

Example 4 includes the subject matter of any one of Examples 1-3, wherein the information regarding the location of the device includes information regarding a latitude and a longitude of the current location or of the target location.

Example 5 includes the subject matter of Example 3, and optionally, wherein the Roaming Targeted-Area field includes a latitude subfield and a longitude subfield respectively including information on a latitude and longitude of the current location or of the target location.

Example 6 includes the subject matter of any one of Examples 3 and 5, and optionally, wherein the Roaming Targeted-Area field has a size of 9 octets.

Example 7 includes the subject matter of Example 5, and optionally, wherein the latitude subfield and the longitude subfield each have a size of 34 bits.

Example 8 includes the subject matter of any one of Examples 5 and 7, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 9 includes the subject matter of Example 8, and optionally, wherein the processing circuitry is to set the BSS Transition Query Reason field to a value of 21 to indicate a presence of the Roaming Targeted-Area field.

Example 10 includes the subject matter of Example 8, and optionally, wherein the BSS Transition Management Query field is between the BSS Transition Query Reason field and the BSS Transition Candidate List Entries field in a time domain.

Example 11 includes the subject matter of any one of Examples 1-3, 5, and 7, and optionally further including a location engine, the location engine to detect movement of the device and to determine a direction of movement of the device, the processing circuitry to use information regarding the movement to generate the first frame.

Example 12 includes the subject matter of any one of Examples 1-3, 5 and 7, and optionally, wherein the processing circuitry is to cause scanning of the one or more channels based on a priority of the one or more APs.

Example 13 includes the subject matter of claims 1-3, 5 and 7, and optionally further including a radio integrated circuit and front-end module circuitry coupled to the radio integrated circuit.

Example 14 includes the subject matter of Example 13, and optionally, further including one or more antennas coupled to the front-end module circuitry.

Example 15 includes a method of operating a wireless communication device, the method including: causing transmission of a first frame to a wireless access point (AP), the first frame including information regarding a location of the device; and processing a second frame from the AP, the second frame including a list of one or more roaming candidate APs, wherein the list is based on the information regarding the location of the device in the first frame; causing scanning of one or more channels corresponding to the one or more roaming candidate APs in response to the second frame; and transitioning to one of the one or more roaming candidate APs after causing scanning.

Example 16 includes the subject matter of Example 15, wand optionally, wherein the first frame is a BSS Transition Management Query frame, and the second frame is a BSS Transition Management Request frame.

Example 17 includes the subject matter of Example 16, wand optionally, wherein the BSS Transition Management Query frame includes a Roaming Targeted-Area field including the information regarding the location of the STA.

Example 18 includes the subject matter of any one of Examples 15-17, wherein the information regarding the location of the device includes information regarding a latitude and a longitude of the current location or of the target location.

Example 19 includes the subject matter of Example 17, and optionally, wherein the Roaming Targeted-Area field includes a latitude subfield and a longitude subfield respectively including information on a latitude and longitude of the current location or of the target location.

Example 20 includes the subject matter of any one of Examples 17 and 19, wherein the Roaming Targeted-Area field has a size of 9 octets.

Example 21 includes the subject matter of Example 19, and optionally, wherein the latitude subfield and the longitude subfield each have a size of 34 bits.

Example 22 includes the subject matter of any one of Examples 19 and 21, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 23 includes the subject matter of Example 22, and optionally, further including setting the BSS Transition Query Reason field to a value of 21 to indicate a presence of the Roaming Targeted-Area field.

Example 24 includes the subject matter of Example w2, and optionally, wherein the BSS Transition Management Query field is between the BSS Transition Query Reason field and the BSS Transition Candidate List Entries field in a time domain.

Example 25 includes the subject matter of any one of Examples 15-17, 19, and 21, further including detecting movement of the device, determining a direction of movement of the device, and using the direction of movement of the device to generate the first frame.

Example 26 includes the subject matter of any one of Examples 15-17, 19 and 21, wherein causing scanning the one or more channels is based on a priority of the one or more APs.

Example 27 includes a product comprising one or more tangible computer-readable non-transitory storage media comprising computer-executable instructions operable to, when executed by at least one computer processor, cause the at least one computer processor to implement operations at a wireless communication device, the operations comprising: causing transmission of a first frame to a wireless access point (AP), the first frame including information regarding a location of the device, the information regarding a location of the device including information regarding a current location of the device or information regarding a target location to result from movement of the device; and processing a second frame from the AP, the second frame including a list of one or more roaming candidate APs, wherein the list is based on the information regarding the location of the device in the first frame; causing scanning of one or more channels corresponding to the one or more roaming candidate APs in response to the second frame; and transitioning to one of the one or more roaming candidate APs after causing scanning.

Example 28 includes the subject matter of Example 27, and optionally, wherein the first frame is a BSS Transition Management Query frame, and the second frame is a BSS Transition Management Request frame.

Example 29 includes the subject matter of Example 28, and optionally, wherein the BSS Transition Management Query frame includes a Roaming Targeted-Area field including the information regarding the location of the STA.

Example 30 includes the subject matter of any one of Examples 28-29, and optionally, wherein the information regarding the location of the device includes information regarding a latitude and a longitude of the current location or of the target location.

Example 31 includes the subject matter of Example 29, and optionally, wherein the Roaming Targeted-Area field includes a latitude subfield and a longitude subfield respectively including information on a latitude and longitude of the current location or of the target location.

Example 32 includes the subject matter of any one of Examples 29 and 31, and optionally, wherein the Roaming Targeted-Area field has a size of 9 octets.

Example 33 includes the subject matter of Example 31, and optionally, wherein the latitude subfield and the longitude subfield each have a size of 34 bits.

Example 34 includes the subject matter of any one of Examples 31 and 33, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 35 includes the subject matter of Example 34, and optionally, wherein the operations further include setting the BSS Transition Query Reason field to a value of 21 to indicate a presence of the Roaming Targeted-Area field.

Example 36 includes the subject matter of Example 34, and optionally, wherein the BSS Transition Management Query field is between the BSS Transition Query Reason field and the BSS Transition Candidate List Entries field in a time domain.

Example 37 includes the subject matter of any one of Examples 27-29, 31, and 33, and optionally, wherein the operations further include detecting movement of the device, determining a direction of movement of the device, and using the direction of movement of the device to generate the first frame.

Example 38 includes the subject matter of any one of Examples 27-29, 31 and 33, and optionally, wherein causing scanning of the one or more channels is based on a priority of the one or more APs.

Example 39 includes a wireless communication device including: means for causing transmission of a first frame to a wireless access point (AP), the first frame including information regarding a location of the device, the information regarding a location of the device including information regarding a current location of the device or information regarding a target location to result from movement of the device; and means for processing a second frame from the AP, the second frame including a list of one or more roaming candidate APs, wherein the list is based on the information regarding the location of the device in the first frame; means for causing scanning of one or more channels corresponding to the one or more roaming candidate APs in response to the second frame; and means for transitioning to one of the one or more roaming candidate APs after causing scanning.

Example 40 includes the subject matter of Example 39, and optionally, wherein the first frame is a BSS Transition Management Query frame, and the second frame is a BSS Transition Management Request frame.

Example 41 includes the subject matter of Example 40, and optionally, wherein the BSS Transition Management Query frame includes a Roaming Targeted-Area field including the information regarding the location of the STA.

Example 42 includes the subject matter of any one of Examples 39-41, and optionally, wherein the information regarding the location of the device includes information regarding a latitude and a longitude of the current location or of the target location.

Example 43 includes the subject matter of Example 41, and optionally, wherein the Roaming Targeted-Area field includes a latitude subfield and a longitude subfield respectively including information on a latitude and longitude of the current location or of the target location.

Example 44 includes the subject matter of any one of Examples 41 and 43, and optionally, wherein the Roaming Targeted-Area field has a size of 9 octets.

Example 45 includes the subject matter of Example 42, and optionally, wherein the latitude subfield and the longitude subfield each have a size of 34 bits.

Example 46 includes the subject matter of any one of Examples 43 and 45, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 47 includes the subject matter of Example 46, and optionally, further including setting the BSS Transition Query Reason field to a value of 21 to indicate a presence of the Roaming Targeted-Area field.

Example 48 includes the subject matter of Example 46, and optionally, wherein the BSS Transition Management Query field is between the BSS Transition Query Reason field and the BSS Transition Candidate List Entries field in a time domain.

Example 49 includes the subject matter of any one of Examples 39-41, 43 and 45, and optionally further including detecting movement of the device, determining a direction of movement of the device, and using the direction of movement of the device to generate the first frame.

Example 50 includes the subject matter of any one of Examples 39-41, 43 and 45, and optionally, wherein causing scanning the one or more channels is based on a priority of the one or more APs.

Example 51 includes a wireless communication device comprising a memory and processing circuitry coupled to the memory, the processing circuitry including logic to: process a first frame from a wireless station (STA), the first frame including information regarding a location of the STA, the information regarding a location of the STA including information regarding a current location of the STA or information regarding a target location to result from movement of the STA; determine a list of one or more roaming candidate access points (APs) based on the information regarding the location of the STA; and cause transmission of a second frame to the STA, the second frame including the list of one or more roaming candidate APs.

Example 52 includes the subject matter of Example 51, and optionally, wherein the first frame is a BSS Transition Management Query frame and the second frame is a BSS Transition Management Request frame, the BSS Transition Management Query frame comprising a Roaming Targeted-Area field including the information regarding the location of the STA.

Example 53 includes the subject matter of Example 52, and optionally, wherein the Roaming Targeted-Area field includes a latitude subfield and a longitude subfield respectively including information on a latitude and longitude of the current location or of the target location.

Example 54 includes the subject matter of any one of Examples 52 and 53, and optionally wherein the Roaming Targeted-Area field has a size of 9 octets, and wherein the latitude subfield and the longitude subfield each have a size of 34 bits.

Example 55 includes the subject matter of any one of Examples 51-53, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 56 includes the subject matter of Example 55, and optionally, wherein the processing circuitry is to process the Roaming Targeted-Area field based on detecting that the BSS Transition Query Reason field has a value of 21.

Example 57 includes the subject matter of Example 55, and optionally, wherein the BSS Transition Management Query field is between the BSS Transition Query Reason field and the BSS Transition Candidate List Entries field in a time domain.

Example 58 includes the subject matter of any one of Examples 51-53, and optionally, further including a radio integrated circuit and front-end module circuitry coupled to the radio integrated circuit.

Example 59 includes the subject matter of Example 58, and optionally, further including one or more antennas coupled to the front-end module circuitry.

Example 60 includes a method of operating a wireless communication device, the method comprising: processing a first frame from a wireless station (STA), the first frame including information regarding a location of the STA, the information regarding a location of the STA including information regarding a current location of the STA or information regarding a target location to result from movement of the STA; determining a list of one or more roaming candidate access points (APs) based on the information regarding the location of the STA; and causing transmission of a second frame to the STA, the second frame including the list of one or more roaming candidate APs.

Example 61 includes the subject matter of Example 60, and optionally, wherein the first frame is a BSS Transition Management Query frame and the second frame is a BSS Transition Management Request frame, the BSS Transition Management Query frame comprising a Roaming Targeted-Area field including the information regarding the location of the STA.

Example 62 includes the subject matter of Example 61, and optionally, wherein the Roaming Targeted-Area field includes a latitude subfield and a longitude subfield respectively including information on a latitude and longitude of the current location or of the target location.

Example 63 includes the subject matter of any one of Examples 61 and 62, and optionally, wherein the Roaming Targeted-Area field has a size of 9 octets, and wherein the latitude subfield and the longitude subfield each have a size of 34 bits.

Example 64 includes the subject matter of any one of Examples 60-62, and optionally, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 65 includes the subject matter of Example 64, and optionally, further including processing the Roaming Targeted-Area field based on detecting that the BSS Transition Query Reason field has a value of 21.

Example 66 includes the subject matter of Example 64, and optionally, wherein the BSS Transition Management Query field is between the BSS Transition Query Reason field and the BSS Transition Candidate List Entries field in a time domain.

Example 67 includes a product comprising one or more tangible computer-readable non-transitory storage media comprising computer-executable instructions operable to, when executed by at least one computer processor, cause the at least one computer processor to implement operations at a wireless communication device, the operations comprising: processing a first frame from a wireless station (STA), the first frame including information regarding a location of the STA, the information regarding a location of the STA including information regarding a current location of the STA or information regarding a target location to result from movement of the STA; determining a list of one or more roaming candidate access points (APs) based on the information regarding the location of the STA; and causing transmission of a second frame to the STA, the second frame including the list of one or more roaming candidate APs.

Example 68 includes the subject matter of Example 67, and optionally, wherein the first frame is a BSS Transition Management Query frame and the second frame is a BSS Transition Management Request frame, the BSS Transition Management Query frame comprising a Roaming Targeted-Area field including the information regarding the location of the STA.

Example 69 includes the subject matter of Example 68, and optionally, wherein the Roaming Targeted-Area field includes a latitude subfield and a longitude subfield respectively including information on a latitude and longitude of the current location or of the target location.

Example 70 includes the subject matter of any one of Examples 68 and 69, and optionally, wherein the Roaming Targeted-Area field has a size of 9 octets, and wherein the latitude subfield and the longitude subfield each have a size of 34 bits.

Example 71 includes the subject matter of any one of Examples 67-69, wherein the BSS Transition Management Query field further includes: a Category field; a Wireless Network Management (WNM) field; a Dialog Token field; a BSS Transition Query Reason field; and an optional BSS Transition Candidate List Entries field; wherein the Category field, the WNM field, the Dialog Token field and the BSS Transition Query Reason field each have a size of 1 octet.

Example 72 includes the subject matter of Example 71, and optionally, wherein the operations further include processing the Roaming Targeted-Area field based on detecting that the BSS Transition Query Reason field has a value of 21.

Example 73 includes the subject matter of Example 71, and optionally, wherein the BSS Transition Management Query field is between the BSS Transition Query Reason field and the BSS Transition Candidate List Entries field in a time domain.

An Abstract is provided. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising a memory and processing circuitry coupled to the memory, the processing circuitry including logic to:
   cause transmission of a first frame to a wireless access point (AP), the first frame including information indicating a target location to result from movement of the device, the first frame further including a first field indicating the target location, and a second field indicating a presence of the first field in the first frame; and
   process a second frame from the AP, the second frame including a list of one or more roaming candidate APs, wherein the list is based on the information regarding the target location in the first frame;
   cause scanning of one or more channels corresponding to the one or more roaming candidate APs in response to the second frame; and
   transition to one of the one or more roaming candidate APs after causing scanning.

2. The wireless communication device of claim 1, wherein the first frame is a BSS Transition Management Query frame, and the first field is a Roaming Targeted-Area field including the information indicating the target location, and the second frame is a BSS Transition Management Request frame.

3. The wireless communication device of claim 2, wherein the Roaming Targeted-Area field includes a latitude subfield and a longitude subfield respectively including information on a latitude and longitude of the target location.

4. The wireless communication device of claim 3, wherein the Roaming Targeted-Area field has a size of 9 octets, and the latitude subfield and the longitude subfield each have a size of 34 bits.

5. The wireless communication device of claim 2, wherein the BSS Transition Management Query field further includes:
   a Category field;
   a Wireless Network Management (WNM) field;
   a Dialog Token field;
   a BSS Transition Query Reason field; and
   an optional BSS Transition Candidate List Entries field;
   wherein the Category field, the WNM field, the Dialog Token field and the BSS Transition Query Reason field each have a size of 1 octet.

6. The wireless communication device of claim 2, wherein the second field is a BSS Transition Query Reason field, and wherein the processing circuitry is to set the BSS Transition Query Reason field to a value to indicate a presence of the Roaming Targeted-Area field.

7. The wireless communication device of claim 1, wherein the processing circuitry is to cause scanning of the one or more channels based on a priority of the one or more APs.

8. The wireless communication device of claim 1, further including a radio integrated circuit and front-end module circuitry coupled to the radio integrated circuit.

9. The wireless communication device of claim 8, further including one or more antennas coupled to the front-end module circuitry.

10. A method of operating a wireless communication device, the method including:
    causing transmission of a first frame to a wireless access point (AP), the first frame including information regarding a target location to result from movement of the device, the first frame further including a first field indicating the target location, and a second field indicating a presence of the first field in the first frame;
    processing a second frame from the AP, the second frame including a list of one or more roaming candidate APs, wherein the list is based on the information regarding the target location in the first frame;
    causing scanning one or more channels corresponding to the one or more roaming candidate APs in response to the second frame; and
    transitioning to one of the one or more roaming candidate APs after causing scanning.

11. The method of claim 10, wherein the first frame is a BSS Transition Management Query frame, and the first field is a Roaming Targeted-Area field including the information regarding the target location, and the second frame is a BSS Transition Management Request frame.

12. The method of claim 11, wherein the Roaming Targeted-Area field includes a latitude subfield and a longitude subfield respectively including information on a latitude and longitude of the target location.

13. The method of claim 12, wherein the Roaming Targeted-Area field has a size of 9 octets, and the latitude subfield and the longitude subfield each have a size of 34 bits.

14. The method of claim 12, wherein the BSS Transition Management Query field further includes:
    a Category field;
    a Wireless Network Management (WNM) field;
    a Dialog Token field;
    a BSS Transition Query Reason field; and
    an optional BSS Transition Candidate List Entries field;
    wherein the Category field, the WNM field, the Dialog Token field and the BSS Transition Query Reason field each have a size of 1 octet.

15. The method of claim 11, wherein the second field is a BSS Transition Query Reason field, the method further including setting the BSS Transition Query Reason field to indicate a presence of the Roaming Targeted-Area field.

16. The method of claim 10, wherein causing scanning the one or more channels is based on a priority of the one or more APs.

17. A product comprising one or more tangible computer-readable non-transitory storage media comprising computer-executable instructions operable to, when executed by at least one computer processor, cause the at least one computer processor to implement operations at a wireless communication device, the operations comprising:

causing transmission of a first frame to a wireless access point (AP), the first frame including information regarding a target location to result from movement of the device, the first frame further including a first field indicating the target location, and a second field indicating a presence of the first field in the first frame; and processing a second frame from the AP, the second frame including a list of one or more roaming candidate APs, wherein the list is based on the information regarding the target location of the device in the first frame;

causing scanning one or more channels corresponding to the one or more roaming candidate APs in response to the second frame; and transitioning to one of the one or more roaming candidate APs after causing scanning.

18. The product of claim 17, wherein the first frame is a BSS Transition Management Query frame, and the first field is a Roaming Targeted-Area field including the information regarding the target location, and the second frame is a BSS Transition Management Request frame.

19. The product of claim 18, wherein the Roaming Targeted-Area field includes a latitude subfield and a longitude subfield respectively including information on a latitude and longitude of target location.

20. The product of claim 19, wherein the Roaming Targeted-Area field has a size of 9 octets, and the latitude subfield and the longitude subfield each have a size of 34 bits.

21. The product of claim 18, wherein the BSS Transition Management Query field further includes:

a Category field;
a Wireless Network Management (WNM) field;
a Dialog Token field;
a BSS Transition Query Reason field; and
an optional BSS Transition Candidate List Entries field;
wherein the Category field, the WNM field, the Dialog Token field and the BSS Transition Query Reason field each have a size of 1 octet.

22. The product of claim 18, wherein the second field is a BSS Transition Query Reason field, and wherein the operations further include setting the BSS Transition Query Reason field to a value to indicate a presence of the Roaming Targeted-Area field.

23. The product of claim 21, wherein the BSS Transition Management Query field is between the BSS Transition Query Reason field and the BSS Transition Candidate List Entries field in a time domain.

24. The product of claim 17, wherein the operations further include detecting movement of the device, determining a direction of movement of the device, and using information regarding movement of the device to generate the first frame.

25. The product of claim 17, wherein scanning the one or more channels is based on a priority of the one or more APs.

* * * * *